United States Patent
Koestler

(10) Patent No.: US 7,149,800 B2
(45) Date of Patent: Dec. 12, 2006

(54) AUDITING COMPUTER SYSTEMS COMPONENTS IN A NETWORK

(75) Inventor: Luke Koestler, Vicksburg, MS (US)

(73) Assignee: Seventh Knight, Vicksburg, MS (US)

( * ) Notice: Subject to any disclaimer, the term of this patent is extended or adjusted under 35 U.S.C. 154(b) by 648 days.

(21) Appl. No.: 10/216,917

(22) Filed: Aug. 13, 2002

(65) Prior Publication Data

US 2003/0225865 A1 Dec. 4, 2003

Related U.S. Application Data

(60) Provisional application No. 60/383,613, filed on May 29, 2002.

(51) Int. Cl.
*G06F 15/173* (2006.01)
(52) U.S. Cl. ............... 709/224; 709/220; 709/223; 719/328
(58) Field of Classification Search ............ 709/224, 709/220, 223; 719/328
See application file for complete search history.

(56) References Cited

U.S. PATENT DOCUMENTS

| 6,055,508 | A | * | 4/2000 | Naor et al. | 705/11 |
| 6,792,392 | B1 | * | 9/2004 | Knight | 702/186 |
| 6,801,940 | B1 | * | 10/2004 | Moran et al. | 709/224 |
| 2002/0026605 | A1 | * | 2/2002 | Terry | 714/37 |
| 2003/0110253 | A1 | * | 6/2003 | Anuszczyk et al. | 709/224 |

* cited by examiner

*Primary Examiner*—Philip B. Tran
(74) *Attorney, Agent, or Firm*—Finnegan, Henderson, Farabow, Garrett & Dunner, LLP

(57) ABSTRACT

Systems and methods for monitoring a plurality of changes to a computing environment on a computer network having one or more client computers, include requesting a registry information from a system registry of the one or more client computers, receiving the registry information, collecting a component information for one or more components of the one or more client computers, and compiling the registry information and the component information into a first data store.

19 Claims, 4 Drawing Sheets

200

AUDITING COMPUTER SYSTEMS COMPONENTS IN A NETWORK

CROSS REFERENCE TO RELATED APPLICATIONS

This application claims the benefit of 35 U.S.C. § 119(e) of U.S. Provisional Application No. 60/383,613, filed May 29, 2002, the contents of which are incorporated herein by reference, in their entirety.

DESCRIPTION OF THE INVENTION

1. Field of the Invention

This invention relates to the field of auditing computer system components.

2. Background of the Invention

Auditing is a term used to describe the collection and compilation of information. When auditing a computer or a computer network, the term refers to the collection and compilation of information describing events that have taken place in the computer or network. Examples of such events are changes to the system registry or file system, transmission or receipt of network traffic, or processing of a task by a foreground application.

Auditing typically involves two stages. First, an auditing process or component monitors the status of a computing environment. To do this, it must gather information from various locations, such as the file system, the system registry, and network interfaces. Second, the information collected by monitoring the system is stored in a data store or database. An auditing process performs both stages continuously so that as changes are made to the system, the auditing process gathers information about the changes, and stores the information in the the changes made to the system and of all events which have taken place on the system.

SUMMARY OF THE INVENTION

In accordance with the invention, systems and methods for monitoring a plurality of changes to a computing environment on a computer network having one or more client computers, including the steps of requesting a registry information from a system registry of the one or more client computers, receiving the registry information, collecting a component information for one or more components of the one or more client computers, and compiling the registry information and the component information into a first data store. Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DETAILED DESCRIPTION

Reference will now be made in detail to the embodiments of the invention, an examples of which are illustrated in the accompanying drawings. Wherever possible, the same reference numbers will be used throughout the drawings to refer to the same or like parts.

Figure 1:
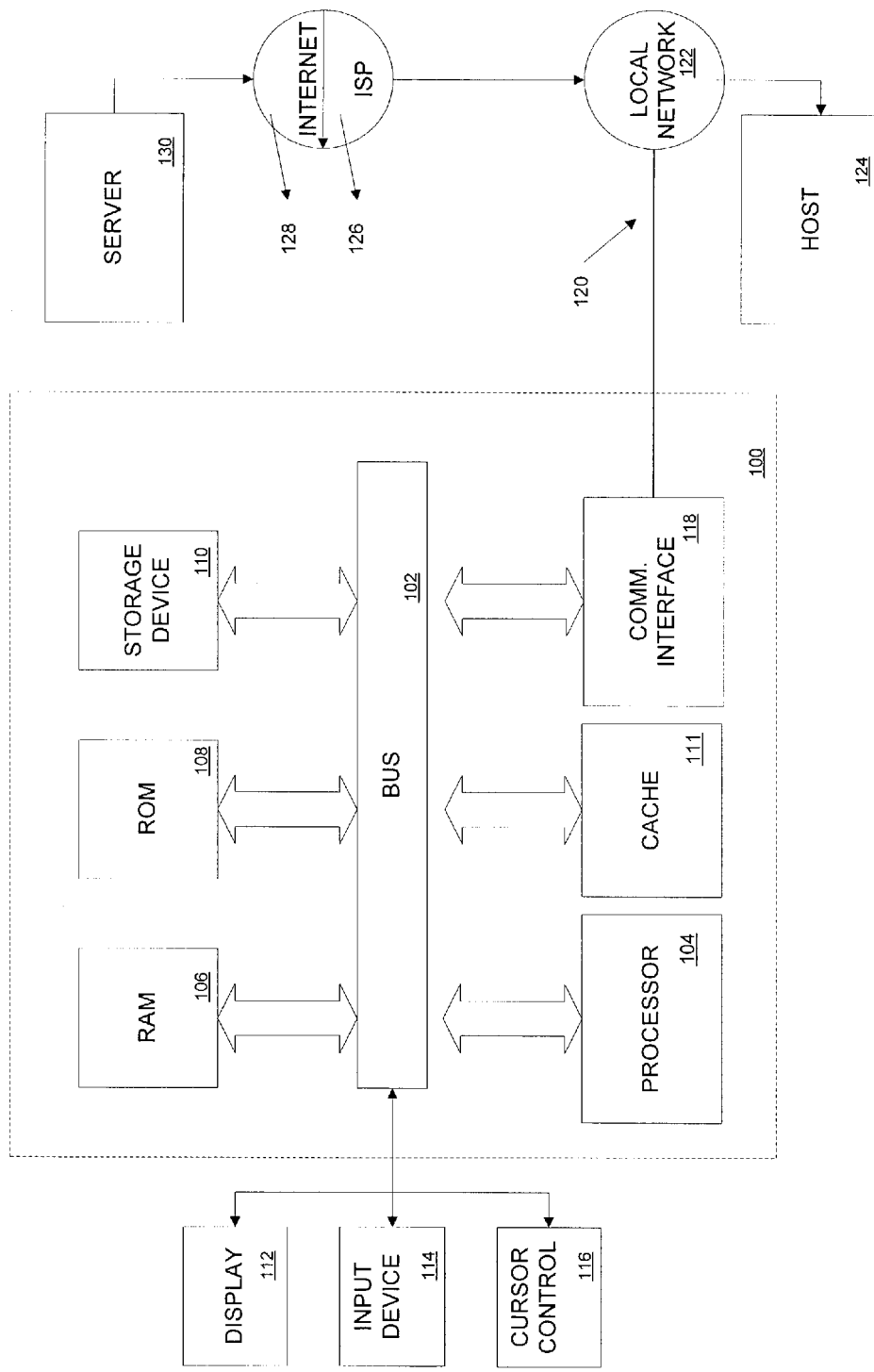
FIG. 1 shows a diagram depicting an exemplary computer system in which systems and methods consistent with the principles of the present may be implemented.

Systems and methods consistent with the present invention may be implemented by computers organized in a conventional distributed processing system architecture. FIG. 1 is a block diagram illustrating a computer system 100 in which an embodiment of the invention may be implemented. Computer system 100 includes bus 102 or other communication mechanism for communicating information, and processor 104 for processing information coupled with bus 102. Computer system 100 also includes a main memory, such as random access memory (RAM) 106 or other dynamic storage device, coupled to bus 102 for storing information and instructions to be executed by processor 104. RAM 106 also may be used for storing temporary variables or other intermediate information during execution of instructions to be executed by processor 104. Computer system 100 may also include cache 111 for storing temporary variables and other information and instructions from RAM 106. It is possible that RAM 106 may not be able to store all information, instructions and variables necessary for processor 104 to run an application. In this case, the instructions, variables, and other information may be moved into cache 111 for temporary storage according to numerous well-known methodologies. This data can be stored in cache 111 until processor 104 requires the information or instructions. When needed, it can be accessed at speeds faster than if it were located in storage device 110 or another form of storage medium. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to display 112, such as a cathode ray tube (CRT), for displaying information to a computer user. Input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112. This input device typically has two degrees of freedom in two axes, a first axis (e.g., x) and a second axis (e.g., y), which allow the device to specify positions in a plane.

The invention is related to the use of computer system 100 for auditing events on a computer system or network.

According to one implementation, systems and methods consistent with the present invention collect system information and store it in a central database in response to processor 104 executing one or more sequences of one or more instructions contained in RAM 106. Such instructions may be read into RAM 106 from another computer-readable medium, such as storage device 110. Execution of the sequences of instructions contained in main memory 106 causes processor 104 to perform the process steps described herein. In an alternative implementation, hard-wired circuitry may be used in place of or in combination with software instructions to implement the invention. Thus, implementations consistent with the principles of the present invention are not limited to any specific combination of hardware circuitry and software.

The term "computer-readable medium" as used herein refers to any media that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 104 for execution. For example, the instructions may initially be carried on the magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to host computer 124 and/or to data equipment operated by Internet Service Provider (ISP) 126. ISP 126, in turn, provides data communication services through the Internet 128. Local network 122 and Internet 128 both use electric, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the present invention, one such downloaded application audits all events on a computer system. The received code may be executed by processor 104 as it is received and/or stored in storage device 110, or other non-volatile storage for later execution. In this manner, computer system 100 may obtain application code in the form of a carrier wave.

Although computer system 100 is shown in FIG. 1 as being connectable to one server, 130, those skilled in the art will recognize that computer system 100 may establish connections to multiple servers on Internet 128. Each such server includes an HTML-based Internet application, which may provide information to computer system 100 upon request in a manner consistent with the present invention.

Figure 2:
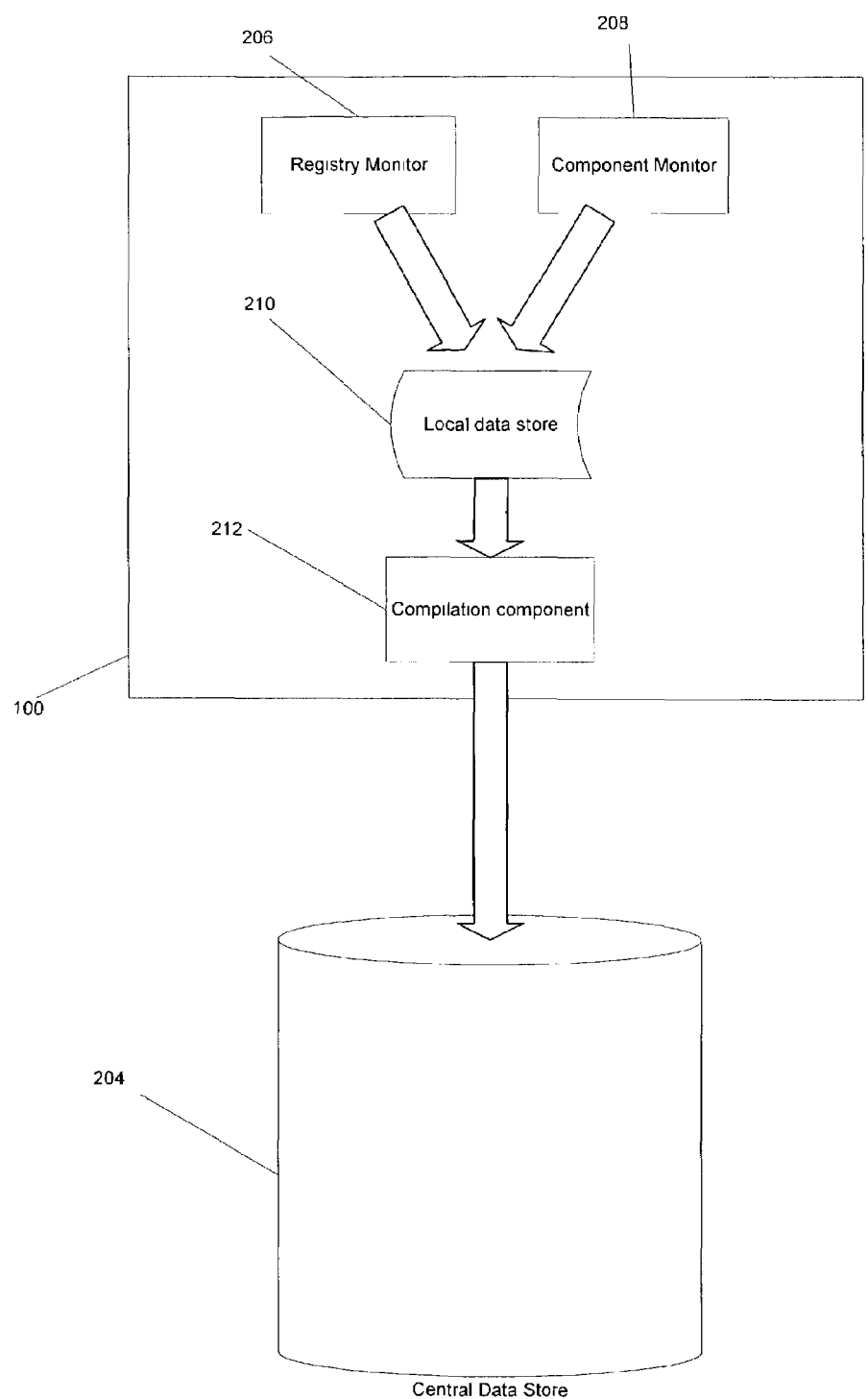
FIG. 2 shows a diagram used to explain the auditing of a system in a manner consistent with the principles of the present invention.

FIG. 2 depicts an exemplary auditing system 200 for auditing a computer or computer network consistent with the principles of the present invention. In FIG. 2, auditing system 200 is shown auditing computer 100. However, one of skill in the art will recognize that the system may be employed to audit host 124, server 130, or any other computer connected to network 122 or Internet 128. In addition, the system may be employed on multiple computers of a network simultaneously, such as to audit all events on a computer network.

System 200 consists of central data store 204, registry monitor 206, component monitor 208, and compilation routine 212. In addition, system 200 optionally includes local data store 210.

Registry monitor 206 collects all computing environment information from the system registry. A system registry is a central compilation of the information required by the operating system during its processing. In Windows-based systems the registry is maintained in a ".ini" file and contains information about, for example, system resources (i.e. hardware drivers, and settings) and network resources (i.e., IP addresses, network protocols). In a Windows-based computer, the registry keeps each individual piece of information in the form of a "key." For example, when a user attempts to log onto a computer, the computer creates a key in its registry identifying the attempted connection.

As registry monitor 206 collects information from the system registry, it stores the information in a data store. If auditing system 200 is employed to audit only computer 100, it may be preferable for central data store 204 to reside on computer 100, and for registry monitor 206 to store information directly in central data store 204, in order to avoid unnecessary transmission of information. However, if auditing system is simultaneously auditing multiple computers on a network, it may be preferable to temporarily store the information in local data store 210 to minimize the amount of network traffic.

Local data store 210 may reside in the memory of computer 100, host 124, or server 130, on a removable storage device, such as a Zip Drive, or on any other computer or computer readable medium. However, it is preferable for the local data store to reside on the computer from which the information is collected.

Components monitor 208 collects information about the computing environment not reflected in the system registry. This may be necessary, for example, where a system registry does not contain all information about the computing environment. For example, the registry of a computer may not contain information about the status of the file system, or about transmissions sent or received across network interfaces. Component monitor 208, therefore may be used to collect information about changes to the file system, such as creation, deletion, or modification of a file, including the time of the change, and user who made the change, information about network transmissions such as the destination and time of all outgoing transmissions, and the source and time of all incoming transmissions, document content, and other user interaction with applications, services, and web services. As with the registry monitor 206, the component monitor 208 stores the collected information in either local data store 210 or central data store 204.

As information from registry monitor 206 and component monitor 208 is stored in a data store, system 200 may need to compile the collected information. Compilation refers to deleting duplicative information from the data store, and, if necessary, transferring the information to central data store 204. Compilation component 212 may delete the duplicative information from either local data store 204 or central data store 210. However, if both are employed, it may be preferable to delete the duplicative information from local data store 210 prior to transferring the information to central data store 204 in order to minimize network traffic. Once the duplicative information has been deleted, compilation routine 212 transfers the information to central data store 204. As will be recognized by one of skill in the art, this may not be necessary when auditing a single computer, where the monitoring routines store gathered information directly in central data store 204.

Compilation component 212 need not compile information continuously. Instead, systems and methods consistent with the present invention may compile the information upon the occurrence of a certain event, such as upon the user logging on to the computer, or powering down the computer. Alternatively, the information may be compiled at certain time intervals, for example, every hour. Alternatively, the information may be compiled upon the user's request to do so. One of skill in the art will recognize that the systems and methods consistent with the present invention do not require any specific method for determining when the information will be compiled.

Central data store 204 maybe a database, or other searchable compilation of data. Central data store 204 may reside on computer 100, host 124, or on server 130. It may reside in storage device 110, or on any other computer readable medium accessible to computer 100.

The components of auditing system 200, such as registry monitor 206, component monitor 208, and compilation routine 212 may be implemented as software containing the instructions capable of performing the described steps, such as an application stored in storage device 110, ROM 108, RAM 106 or other computer readable medium accessible to computer 100. In addition, the components may be implemented as hardware, such as chips containing the instructions necessary to carry out the described steps.

Figure 3:
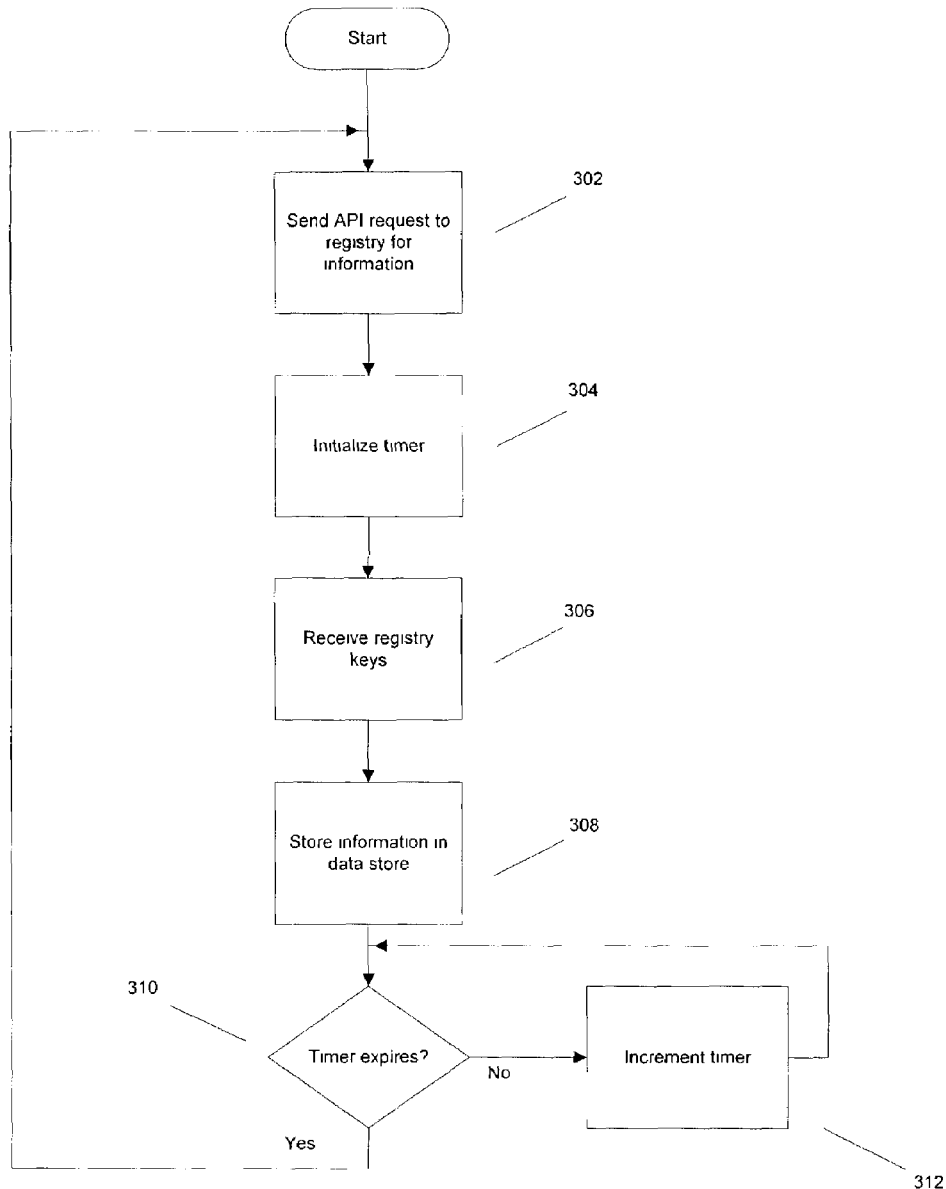
FIG. 3 shows a flowchart depicting the steps performed by a registry monitor consistent with the principles of the present invention.

FIG. 3 shows a flowchart depicting exemplary steps performed by registry monitor 206 consistent with the principles of the present invention. Registry monitor 206 begins by sending a request to the registry for all information contained within it, step 302. In one configuration, registry monitor 206 sends an API declaration to the kernel of the operating system requesting this information. An API declaration is a command used by applications in Windows-based computers requesting the operating system to perform certain tasks. In a Windows-based computer, API declarations may be used to access information in the registry. For example, the API declaration "Public Declare Function GetWindowThreadProcessid Lib "user32" (ByVal hWnd As Long, IpdwProcessId As Long) As Long" will request from the registry information identifying the windows that are open; "Public Declare Function ProcessToolhelpSnapshot Lib "kernel32" Alias "CreateToolhelp32Snapshot" (ByVal IFIgas As Long, ByVal IProcessID As Long) As Long" and Public Declare Function ProcessFirst Lib "kernel32" Alias "Process32First" (ByVal hSnapshot As Long, uProcess As PROCESSENTRY32) As Long" will request from the registry information identifying the processes that are running; and Public Declare Sub CloseHandle Lib "kernel32" (ByVal hPass As Long) will request information identifying the files that an application has opened and about what threads are associated with that application. These API declarations may be implemented by declaring the following variables:

Public Type PROCESSENTRY32
   dwSize As Long
   cntUsage As Long
   th32ProcessID As Long
   th32DefaultHeapID As Long
   th32ModuleID As Long
   cntThreads As Long
   th32ParentProcessID As Long
   pcPriClassBase As Long
   dwflags As Long
   szexeFile As String * MAX_PATH
   End Type One of ordinary skill in the art will recognize that, consistent with the principles of the present invention, any information located in the registry (or any subset thereof) may be retrieved by registry monitor 206. As a result, additional API declaration may be used to request other information. A more complete list of API declarations, including those that may be used to request information from the system registry are maintained and updated by Microsoft Corporation, and are accessible as part of Microsoft's Visual Basic Toolkits or at msdn.microsoft.com.

Alternatively, registry monitor 206 may send multiple API requests as necessary to gather all keys for all information in the registry. In addition, in one configuration, registry monitor 206 may collect certain information from the registry, for example information about hardware device drivers. In this case, registry monitor 206 sends the API declaration requesting this information. One of ordinary skill will recognize that the exact request or API declaration used may vary. However, the principles of the present invention require that the routine use the requests to gather some or all of the information from the registry.

Once registry monitor 206 sends the request for the information, it then initializes a timer (step 304). The timer may be set to expire at any length of time, such as, for example, 1000 milliseconds. In one configuration, the length at which the timer is set may be long enough to allow registry monitor 206 to receive the information, and store the received information in local data store 210 prior to expiration of the timer.

Once the operating system receives the request, it will process the request, and, in the course of processing, will send the requested information to registry monitor 206. Once the registry monitor 206 receives the requested information, step 306, it stores the information in local data store 210 (step 308). When storing the information in the database registry monitor 206 may, in one configuration, enter all information received from the operating system in the database. Registry monitor 206 then checks to see if the timer has expired (step 310). If the timer has not expired, it increments the timer (step 312) and again checks to see if the timer has expired. This process is repeated until the timer expires, at which time registry monitor 206 returns to step 302 to repeat the process.

Upon each successive iteration of the process, registry monitor 206 may store received information, which is not duplicative of information already stored, or may simply store all keys returned by the API request (step 308). Information could be duplicative if the data store 210 has not yet been compiled and a key has remained in the registry for longer than the length of the timer. For example, when registry monitor 206 sends the API request to the operating system, it receives all information entered in the registry (step 306, FIG. 3), i.e. all keys in the registry. This information is stored in local data store 210 (step 308, FIG. 3). Once the timer expires, the process is then repeated. Upon the repeated request to the operating system, all keys may be sent to registry monitor 206. While some of these keys may have changed (been added or deleted), many will be identical to those previously received by registry monitor 206. If local data store 210 still has these keys, then the information will be duplicative. In one configuration, registry monitor 206 will store all entries in data store 210. Alternatively, registry monitor 206 may only store non-duplicative entries into data store 210.

Consistent with the principles of the present invention, auditing system 200 may employ a plurality of registry monitors that simultaneously perform the steps depicted in FIG. 3. For example, in one implementation, a first registry monitor would send the API request, initialize a first timer, receive information, and store it in data store 210. A second registry monitor would perform the same steps. however, the timer for the second registry monitor may be set to expire at a different time than the first routine's timer. For example, the second timer may be set to expire while the first routine is storing the information in the database. While it is not necessary to stagger the timers at any specific interval, staggering the timers allows the registry monitoring component to ensure that all keys, even those that are in the registry for a short time are audited.

For example, if auditing system 200 is configured to use only one registry monitor 208, then a timer length of 1000 milliseconds may cause the routine to miss some entries in the registry. A user may attempt to log onto a share on computer 100 after the keys have been sent to registry monitor 206. If the login attempt is denied, the key will be deleted. Such a key may only be in the registry for 300 milliseconds. If the key is both entered into and deleted from registry prior to the expiration of the timer (step 310), the registry monitor will never receive a key indicating that the attempt was made.

If, however, multiple registry monitors are used, each staggered so that the API requests are sent at certain intervals, the likelihood of missing keys, which last a very short duration, is significantly reduced. In the above example, if, while the first registry monitor was storing the received keys, the timer of a second registry monitor expires, and it sends an API request for the registry information, then the time between requests made to the operating system is reduced, for example to 500 milliseconds. Because the time between requests is therefore reduced (500 milliseconds as contrasted with 1000 milliseconds), the likelihood that all keys will be audited is increased. While it is possible to utilize several registry monitors and shorter timer lengths to reduce the chance of missing a key to almost zero, this process requires extensive processor time, and will likely result in a processor that is bogged down by the auditing process. As a result, the principles of the present invention do not require that the number of registry monitors and length of the timers reduce the number of missed keys to zero.

Figure 4:
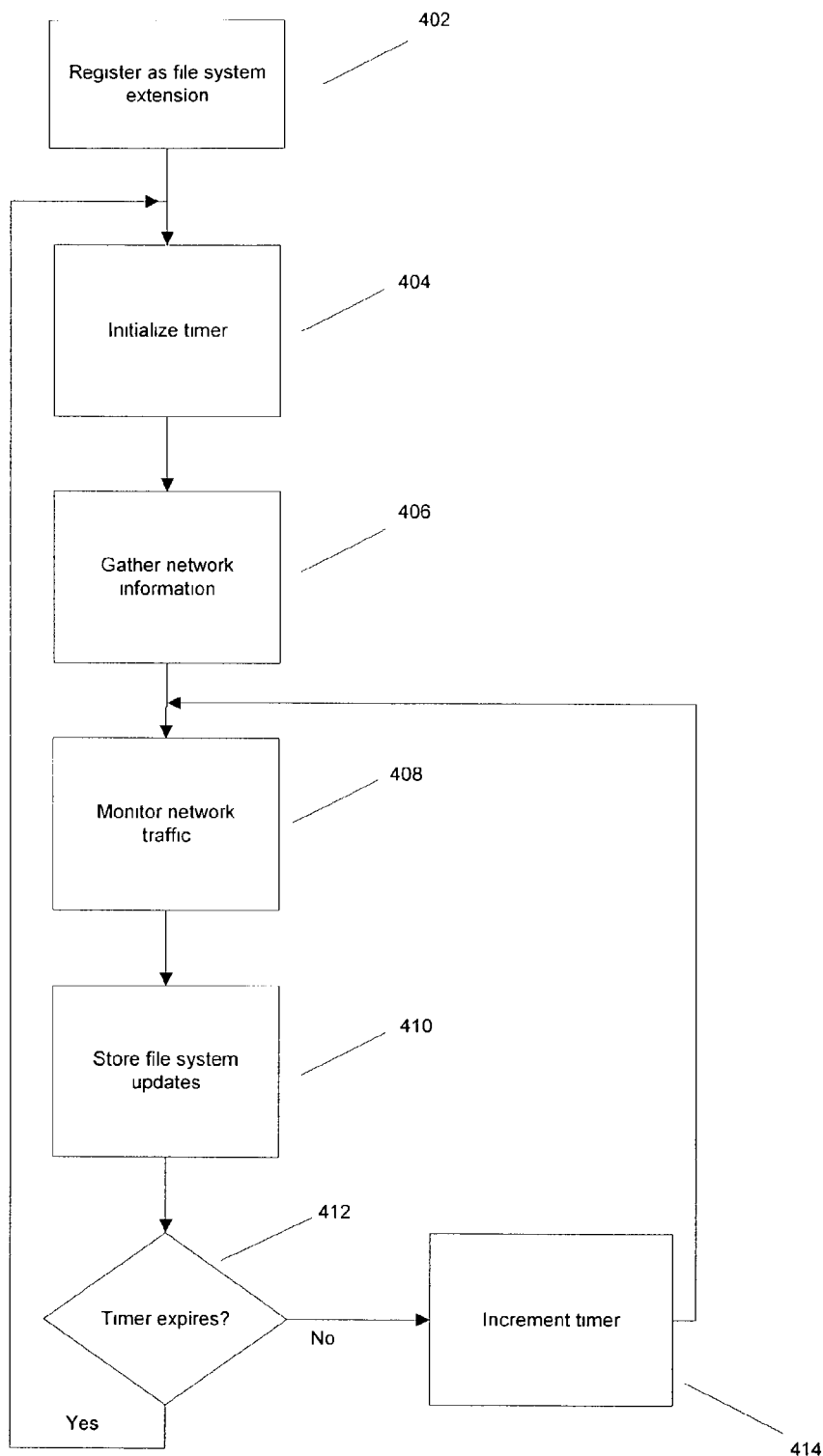
FIG. 4 shows a flowchart depicting the steps performed to collect information about system components in a manner consistent with the principles of the present invention.

FIG. 4 shows a flowchart depicting the steps performed by component monitor 208. Component monitor 208 begins by registering with the operating system as a file system extension, step 402. A process or routine that is registered as a file system extension will be identified in the system registry by a key, and will automatically receive notification from the operating system of all files system changes (i.e., creation, deletion, or modification of a file or directory). A routine can register as a file system extension by sending an API request to the operating system requesting that it be registered as a file system entity. One API request for registering as a file system extension takes the form "Declare Function SHChangeNotifyRegister Lib "shell32" Alias "#2" _ (ByVal hWnd As long, _ ByVal uFlags As SHCN_ItemFlags,_By-Val dwEventID As SHCN_EventIDS,_ By Val uMsg As Long, ByVal cItems As Long, Ipps As PIDLSTRUCT) As Long." This API declaration may be made upon declaring the following variables:

Private m_hSHNotify As Long
    Private m_pidIDesktop As Long
    Public Const WM_SHNOTIFY=&H401
    Public Type PIDLSTRUCT
      pidI As Long
      bWatchSubFolders As Long
    End Type Component monitor 208 then initiates a timer (step 404). The timer may be set to expire at any length of time, such as, for example, 1000 milliseconds. Component monitor 208 then gathers information about existing network connections (step 406). This may, in one configuration be done using API Declaration "Declare Function GetTcpTable Lib "iphipapi.dll" (ByRef pTcpTable As SKI_TCPTABLE, ByRef pdwSize As Long, ByVal bOrder As Long) As Long" to request TCP connection information from the TCP table of the registry. This API declaration may be made upon declaring the following variables:

Type SKI_TCPROW
      dwState As Long
      dwLocalAddr As Long
      dwLocalPort As Long
      dwRemoteAddr As Long
      dwRemotePort As Long
    End Type
    Type SKI_TCPTABLE
      dwNumEntries As Long
      table(100) As SKI_TCPROW End Type
Public SKI_TCPTABLE As SKI_TCPTABLE
Public IP_States(13) As String Component monitor 208 may employ additional API declarations to retrieve additional network information from the registry, such as all keys identifying hardware connections, IP address and port addresses, and ICMP, UDP, IPX/SPX or other protocol connection information. One of ordinary skill in the art will recognize that, consistent with the principles of the present invention, any network information located in the registry (or any subset thereof) may be retrieved by Component monitor 208. As a result, additional API declaration may be used to request other information. A more complete list of API declarations, including those that may be used to request information from the system registry are maintained and updated by Microsoft Corporation, and are accessible as part of Microsoft's Visual Basic Toolkits or at msdn.microsoft.com. Alternatively, the system monitoring component may find this information in the data store used by the registry monitoring component (if that component is configured to collect and store this information).

Once component monitor 208 has collected the network information, it then monitors network traffic (step 408). To do this, component monitor 208 listens to all port numbers and IP addresses identified by the information collected at step 406. As information arrives at the identified port and IP addresses, component monitor 208 identifies it and stores the identifying information in data store 210. The identifying information may include such information as the time received, size of the packets received, sender identification information, IP and port address on which it was received, or any other identifying information.

In addition, as the system monitoring component listens for information from the different network connections, component monitor 208 will receive notifications of every change made to the file system (step 410). These updates will be sent by the operating system automatically to all file system extensions, including component monitor 208. The updates may come at any time, as a file system change may occur at any time (and thus step 410, may occur in any order). As these updates are received, they will also be stored into data store 210. In addition, identifying information such as the user who made the modification, the time, the name and location of the file or directory modified may be added to data store 210.

Component monitor 208 determines if the timer has expired (if the predetermined length of time has elapsed) (step 412). If the timer has not expired, then the routine increments the timer (step 414). Component monitor 208 then returns to step 408 to continue listening on the network connections.

If the timer expires, step 412, then component monitor 208 returns to step 404 to reinitialize the timer. It then once again gathers information about network connections (step 406). Network connections may have been added, deleted or changed during the duration of the timer. Thus, repeating this step at certain intervals ensures that component monitor 208 is listening on all currently connected network connections. In addition, the timer also ensures that the process is never cached into cache 111, and is thus able to listen consistently to all network connections.

Compilation component 212 may then compile data store 210 from each network computer into central data store 204. To do so, it may first eliminate any duplicate entries from data store 210 (step 502). This allows the compilation routine to reduce the amount of information that must be transmitted to the central data store 204. Once all duplicate entries are deleted, the entries from local data store 210 may be transmitted to and entered into data store 204. Data store 204 comprises an interface for searching the data store.

In one configuration, system 200 audits a standalone computer 100, i.e. computer 100 is not connected to any network. In such a configuration, the compilation routine 212 may eliminate duplicate entries from the data store. As computer 100 is not connected to other computers in this configuration, there may be no need to transfer the information to central data store 204. Instead, data store 204 could serve as central data store 210 for all information collected. In this case, data store 204 would contain an interface for searching the database.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for monitoring a plurality of changes to a computing environment on a computer network comprising one or more client computers, the method comprising:
    initiating a first timer set to expire after a first predetermined time period and a second timer set to expire after a second predetermined time period, wherein the first and second timers will not expire at the same time;
    requesting a registry information from a system registry of the one or more client computers upon expiration of one of the first timer and the second timer, wherein the requesting comprises sending one or more Application Program Interface (API) declarations to the system registry;
    receiving the registry information;
    collecting a component information for one or more components of the one or more client computers; and
    compiling the registry information and the component information into a first data store.

2. The method of claim 1, wherein the at least one of the plurality of client computers comprises a Windows-based computer.

3. The method of claim 2, wherein the collecting comprises registering as a file system extension.

4. The method of claim 1, wherein the first data store is a memory device associated with the client computer, and wherein the method further comprises compiling the information in the first data store into a central data store.

5. The method of claim 4, wherein the method further comprises providing a user interface for searching the contents of the central data store.

6. The method of claim 1, wherein the collecting comprises collecting information about all network communications received by the client computer.

7. A system for monitoring a plurality of changes to a computing environment on a computer network comprising one or more client computers, comprising:
    a first timer set to expire after a first predetermined time period;
    a second timer set to expire after a second predetermined time period, wherein the first and second timers will not expire at the same time;
    a registry monitor requesting a registry information from a system registry of the one or more client computers, and receiving the registry information, wherein the registry monitor requests the registry information upon expiration of one of the first timer and the second timer, wherein the registry monitor reguests the registry information by sending one or more Application Program Interface (API) declarations to the system registry;

a component monitor collecting a component information for one or more components of the one or more client computers;

a first data store associated with each of the one or more client computers; and a compiler associated with each of the one or more client computers storing the registry information and the component information into the first data store associated with that client computer.

8. The system of claim 7, wherein the client computer comprises a Windows-based computer.

9. The system of claim 8, wherein the component monitor registers the system as a file system extension.

10. The system of claim 7, wherein the system further comprises a central data store interconnected to the one or more client computers.

11. The system of claim 10, wherein the central data store comprises a compilation of information from the first data store of each of the one or more client computers.

12. The system of claim 10, wherein the system further comprises providing a user interface for searching the contents of the central data store.

13. The system of claim 7, wherein the client computer comprises a network connection, and wherein the component monitor collects information about a communication received at the client computer via the network connection.

14. A computer-readable storage medium containing instructions for a method for monitoring a plurality of changes to a computing environment on a computer network comprising hail one or more client computers, the method comprising:

initiating a first timer set to expire after a first predetermined time period and a second timer set to expire after a second predetermined time period, wherein the first and second timers will not expire at the same time;

requesting a registry information from a system registry of the one or more client computers upon expiration of one of the first timer and the second timer, wherein the requesting comprises sending one or more Application Program Interface (API) declarations to the system registry;

receiving the registry information;

collecting a component information for one or more components of the one or more client computers; and compiling the registry information and the component information into a first data store.

15. The computer-readable storage medium of claim 14, wherein the at least one of the plurality of client computers comprises a Windows-based computer.

16. The computer-readable storage medium of claim 15, wherein the collecting comprises registering as a file system extension.

17. The computer-readable storage medium of claim 14, wherein the first data store is a memory device associated with the client computer, and wherein the method further comprises compiling the information in the first data store into a central data store.

18. The computer-readable storage medium of claim 17, wherein the method further comprises providing a user interface for searching the contents of the central data store.

19. The computer-readable storage medium of claim 14, wherein the collecting comprises collecting information about all network communications received by the client computer.

* * * * *

UNITED STATES PATENT AND TRADEMARK OFFICE
CERTIFICATE OF CORRECTION

PATENT NO. : 7,149,800 B2 Page 1 of 1
APPLICATION NO. : 10/216917
DATED : December 12, 2006
INVENTOR(S) : Luke Koestler It is certified that error appears in the above-identified patent and that said Letters Patent is hereby corrected as shown below:

Column 11, line 33, "comprising hail one" should read --comprising a one--.

Signed and Sealed this

Sixth Day of March, 2007

JON W. DUDAS
*Director of the United States Patent and Trademark Office*